US 9,846,960 B2

(12) United States Patent
Kirk et al.

(10) Patent No.: US 9,846,960 B2
(45) Date of Patent: Dec. 19, 2017

(54) AUTOMATED CAMERA ARRAY CALIBRATION

(75) Inventors: Adam G. Kirk, Renton, WA (US); Yaron Eshet, Seattle, WA (US); David Eraker, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 562 days.

(21) Appl. No.: 13/566,877

(22) Filed: Aug. 3, 2012

(65) Prior Publication Data

US 2013/0321589 A1 Dec. 5, 2013

Related U.S. Application Data

(60) Provisional application No. 61/653,983, filed on May 31, 2012.

(51) Int. Cl.
| | |
|---|---|
| *G06T 15/04* | (2011.01) |
| *G06T 17/00* | (2006.01) |
| *H04N 7/14* | (2006.01) |
| *H04N 13/02* | (2006.01) |
| *G06T 15/08* | (2011.01) |
| *G06T 15/20* | (2011.01) |

(Continued)

(52) U.S. Cl.
CPC .............. *G06T 15/04* (2013.01); *G06T 15/08* (2013.01); *G06T 15/205* (2013.01); *G06T 17/00* (2013.01); *H04N 7/142* (2013.01); *H04N 7/15* (2013.01); *H04N 13/0014* (2013.01); *H04N 13/0239* (2013.01); *H04N 13/0257* (2013.01); *G06T 2210/56* (2013.01); *H04R 2227/005* (2013.01)

(58) Field of Classification Search
CPC ....... G06T 15/04; G06T 15/08; G06T 15/205; G06T 17/00; G06T 2210/56; H04N 7/142; H04N 7/15; H04N 13/0014; H04N 13/0239; H04N 13/0257; H04R 2227/005
See application file for complete search history.

(56) References Cited

U.S. PATENT DOCUMENTS

| | | |
|---|---|---|
| 5,602,903 A | 2/1997 | LeBlanc |
| 5,850,352 A | 12/1998 | Moezzi et al. |
| 5,926,400 A | 7/1999 | Kytle et al. |

(Continued)

OTHER PUBLICATIONS

Chang et al., Principal Component Analysis-based Mesh Decomposition, J. Inf. Sci. Eng., May 2009, vol. 25, No. 4, pp. 971-987.

(Continued)

*Primary Examiner* — Michael Teitelbaum
(74) *Attorney, Agent, or Firm* — Katrina A. Lyon; Lyon & Harr, LLP (57) ABSTRACT

The automated camera array calibration technique described herein pertains to a technique for automating camera array calibration. The technique can leverage corresponding depth and single or multi-spectral intensity data (e.g., RGB (Red Green Blue) data) captured by hybrid capture devices to automatically determine camera geometry. In one embodiment it does this by finding common features in the depth maps between two hybrid capture devices and derives a rough extrinsic calibration based on shared depth map features. It then uses the intensity (e.g., RGB) data corresponding to the depth maps and uses the features of the intensity (e.g., RGB) data to refine the rough extrinsic calibration.

13 Claims, 5 Drawing Sheets

(51) Int. Cl.
*H04N 7/15* (2006.01)
*H04N 13/00* (2006.01)

(56) References Cited

U.S. PATENT DOCUMENTS

| | | | |
|---|---|---|---|
| 5,952,993 | A | 9/1999 | Matsuda et al. |
| 6,072,496 | A | 6/2000 | Guenter |
| 6,163,337 | A | 12/2000 | Azuma et al. |
| 6,226,003 | B1 | 5/2001 | Akeley |
| 6,327,381 | B1 | 12/2001 | Rogina et al. |
| 6,496,601 | B1 | 12/2002 | Migdal |
| 6,509,902 | B1 | 1/2003 | Pfister et al. |
| 6,556,199 | B1 | 4/2003 | Fang et al. |
| 6,750,873 | B1 | 6/2004 | Bernardini et al. |
| 6,781,591 | B2 | 8/2004 | Raskar |
| 6,968,299 | B1 | 11/2005 | Bernardini et al. |
| 7,023,432 | B2 | 4/2006 | Fletcher |
| 7,096,428 | B2 | 8/2006 | Foote |
| 7,106,358 | B2 | 9/2006 | Valliath |
| 7,142,209 | B2 | 11/2006 | Uyttendaele |
| 7,286,143 | B2 | 10/2007 | Kang |
| 7,348,976 | B2 | 3/2008 | Mori |
| 7,551,232 | B2 | 6/2009 | Winger |
| D610,105 | S | 2/2010 | Graham |
| 7,671,893 | B2 | 3/2010 | Li |
| 7,702,016 | B2 | 4/2010 | Winder |
| 7,778,491 | B2 | 8/2010 | Steedly |
| 7,840,638 | B2 | 11/2010 | Zhang |
| 8,036,491 | B2 | 10/2011 | Matsui |
| 8,106,924 | B2 | 1/2012 | Aliprandi et al. |
| 8,156,239 | B1 | 4/2012 | Ashrafi |
| 8,411,126 | B2 | 4/2013 | Lee et al. |
| 8,441,482 | B2 | 5/2013 | Ozdac et al. |
| 2002/0186216 | A1 | 12/2002 | Baumberg et al. |
| 2002/0196256 | A1 | 12/2002 | Hoppe |
| 2003/0038892 | A1 | 2/2003 | Wang et al. |
| 2003/0085992 | A1 | 5/2003 | Arpa et al. |
| 2003/0218672 | A1 | 11/2003 | Zhang |
| 2004/0044441 | A1 | 3/2004 | Gupta et al. |
| 2004/0217956 | A1 | 11/2004 | Besl et al. |
| 2005/0001832 | A1 | 1/2005 | Shen et al. |
| 2005/0013465 | A1* | 1/2005 | Southall et al. ............... 382/103 |
| 2005/0017969 | A1 | 1/2005 | Sen |
| 2005/0052452 | A1 | 3/2005 | Baumberg |
| 2005/0075167 | A1 | 4/2005 | Beaulieu et al. |
| 2005/0280646 | A1 | 12/2005 | Wang |
| 2005/0285875 | A1 | 12/2005 | Kang |
| 2005/0286759 | A1 | 12/2005 | Zitnick, III et al. |
| 2006/0023782 | A1 | 2/2006 | Cai |
| 2006/0028473 | A1 | 2/2006 | Uyttendaele |
| 2006/0028489 | A1 | 2/2006 | Uyttendaele |
| 2006/0158509 | A1 | 7/2006 | Kenoyer |
| 2006/0221072 | A1 | 10/2006 | Se et al. |
| 2006/0262856 | A1 | 11/2006 | Wu |
| 2006/0267977 | A1 | 11/2006 | Barfuss et al. |
| 2006/0290695 | A1 | 12/2006 | Salomie |
| 2007/0070177 | A1 | 3/2007 | Christensen |
| 2007/0124015 | A1 | 5/2007 | Chen et al. |
| 2007/0153000 | A1 | 7/2007 | Xie et al. |
| 2007/0236656 | A1 | 10/2007 | Jeong |
| 2007/0237420 | A1 | 10/2007 | Steedly et al. |
| 2007/0263080 | A1 | 11/2007 | Harrell |
| 2008/0043024 | A1 | 2/2008 | Schiwietz et al. |
| 2008/0088626 | A1 | 4/2008 | Habe |
| 2008/0095465 | A1 | 4/2008 | Mullick et al. |
| 2008/0298571 | A1 | 12/2008 | Kurtz et al. |
| 2009/0016641 | A1 | 1/2009 | Paladini et al. |
| 2009/0033740 | A1 | 2/2009 | Ishikawa |
| 2009/0109280 | A1 | 4/2009 | Gotsman |
| 2009/0128548 | A1 | 5/2009 | Gloudemans |
| 2009/0128568 | A1 | 5/2009 | Gloudemans et al. |
| 2009/0215533 | A1* | 8/2009 | Zalewski et al. ............... 463/32 |
| 2009/0262977 | A1 | 10/2009 | Huang et al. |
| 2009/0290811 | A1 | 11/2009 | Imai |
| 2009/0315978 | A1 | 12/2009 | Wurmlin et al. |
| 2010/0026712 | A1 | 2/2010 | Aliprandi |
| 2010/0080448 | A1 | 4/2010 | Tam |
| 2010/0142824 | A1 | 6/2010 | Lu |
| 2010/0158388 | A1 | 6/2010 | Bookout |
| 2010/0201681 | A1 | 8/2010 | Criminisi |
| 2010/0225735 | A1 | 9/2010 | Shaffer |
| 2010/0254627 | A1 | 10/2010 | Panahpour Tehrani et al. |
| 2010/0259595 | A1 | 10/2010 | Trimeche |
| 2010/0262628 | A1 | 10/2010 | Singer |
| 2010/0265248 | A1 | 10/2010 | McCrae |
| 2010/0303303 | A1 | 12/2010 | Shen et al. |
| 2010/0321378 | A1 | 12/2010 | Betzler |
| 2010/0328437 | A1* | 12/2010 | Lee ............................. 348/47 |
| 2010/0328475 | A1 | 12/2010 | Thomas |
| 2010/0329358 | A1 | 12/2010 | Zhang |
| 2011/0032251 | A1 | 2/2011 | Pothana |
| 2011/0050859 | A1 | 3/2011 | Kimmel |
| 2011/0058021 | A1 | 3/2011 | Chen |
| 2011/0084983 | A1 | 4/2011 | Demaine |
| 2011/0093273 | A1 | 4/2011 | Lee |
| 2011/0096832 | A1 | 4/2011 | Zhang |
| 2011/0122225 | A1 | 5/2011 | Kim et al. |
| 2011/0142321 | A1 | 6/2011 | Huffman |
| 2011/0169824 | A1 | 7/2011 | Fujinami |
| 2011/0181685 | A1 | 7/2011 | Saleh |
| 2011/0211749 | A1 | 9/2011 | Tan |
| 2011/0252320 | A1 | 10/2011 | Arrasvuori et al. |
| 2011/0261050 | A1 | 10/2011 | Smolic et al. |
| 2011/0267344 | A1 | 11/2011 | Germann et al. |
| 2011/0282471 | A1 | 11/2011 | Pavlovskaia et al. |
| 2011/0304619 | A1 | 12/2011 | Fu et al. |
| 2012/0026296 | A1* | 2/2012 | Lee ................... H04N 13/0246 348/47 |
| 2012/0075303 | A1 | 3/2012 | Johnsson |
| 2012/0114039 | A1 | 5/2012 | Wang |
| 2012/0127267 | A1* | 5/2012 | Zhang et al. ................... 348/43 |
| 2012/0141016 | A1* | 6/2012 | Wildeboer et al. ........... 382/154 |
| 2012/0155680 | A1 | 6/2012 | Chen et al. |
| 2013/0039632 | A1 | 2/2013 | Feinson |
| 2013/0257853 | A1 | 10/2013 | Schmidt |
| 2013/0286204 | A1 | 10/2013 | Cheng |
| 2014/0198182 | A1 | 7/2014 | Ward et al. |
| 2014/0219550 | A1 | 8/2014 | Popa et al. |

OTHER PUBLICATIONS

Kalvin et al., Superfaces: Polygonal Mesh Simplification with Bounded Error, J. IEEE Comp. Graphics and Applications, May 1996, vol. 16, No. 3, pp. 64-77.

Kanade et al., Virtualized Reality: Constructing Virtual Worlds from Real Scenes, IEEE Multimedia, Immersive Telepresence, Jan. 1997, vol. 4, No. 1, pp. 34-47.

Morvan, Y., C. O'Sullivan, Visual Tuning of an Image-Based Rendering Algorithm, Proc. of Eurographics, Oct. 2006, pp. 1-6, Ireland, Dublin. 2006.

Newcombe et al., Live Dense Reconstruction with a Single Moving Camera, The Twenty-Third IEEE Conf. on Comp. Vision and Pattern Recognition, CVPR 2010, Jun. 2010, pp. 1498-1505, San Francisco, CA, USA.

Rus et al., Analysing the Influence of Vertex Clustering on PCA-Based Dynamic Mesh Compression, Proc. of the 6th Int'l Conf. on Articulated Motion and Deformable Objects, AMDO 2010, Jul. 2010, pp. 55-66, Port d'Andratx, Mallorca, Spain.

Rusinkiewicz et al., Qsplat: A Multiresolution Point Rendering System for Large Meshes, Proc. of the 27th Annual Conf. on Comp. Graphics, SIGGRAPH 2000, Jul. 23-28, 2000, pp. 343-352, New Orleans, Louisiana, USA.

Wikipedia, K-d-tree.pdf, May 2, 2012, p. 1.

Yang, Yi, U.S. Office Action, U.S. Appl. No. 13/566,796, dated Apr. 18, 2014, pp. 1-13.

Wills, Diane M., U.S. Office Action, U.S. Appl. No. 13/599,263, dated May 29, 2014, pp. 1-19.

Li, et al., "Joint View Filtering for Multiview Depth Map Sequences", In 19th IEEE International Conference on Image Processing, Sep. 30, 2012, pp. 1329-1332.

(56) References Cited

OTHER PUBLICATIONS

Morvan, et al., "Multiview Depth-Image Compression Using an Extended H.264 Encoder", In Advanced Concept for Intelligent Vision Systems, Aug. 28, 2007, pp. 675-686.
Ochotta, et al., "Image-Based Surface Compression", In Computer Graphics Forum, vol. 27, Issue 6, Sep. 1, 2008, 15 Pages.
Park et al., "Efficient Depth Compression Based on Partial Surface for 3-D Object Represented by Layered Depth Images", In IEEE Signal Processing Letters, vol. 17, Issue 10, Oct. 1, 2010, pp. 839-842.
Sun, et al., "Rate-Distortion Optimized 3D Reconstruction from Noise-Corrupted Multi view Depth Videos", In IEEE International Conference on Multimedia and Expo, Jul. 15, 2013, pp. 1-6.
Mamou, K. et al., A simple and efficient approach for 3D mesh approximate convex decomposition, 16th Int'l Conf. on Image Processing, ICIP, Nov. 2009, pp. 3501-3504, Cairo, Egypt.
Wills, Diane M., U.S. Notice of Allowance, U.S. Appl. No. 13/599,263, dated Aug. 21, 2014, pp. 1-7.
Aliaga, D. G., I. Carlbom, Aspatial image hierarchy for compression in image-based-rendering, Proc. of the 2005 Int'l Conf. on Image Processing, ICIP 2005, Sep. 11-14, 2005, pp. 609-612, vol. 1, Genoa, Italy.
Arsenault, R., C. Ware, Frustum view angle, observer view angle and VE navigation, Proc. of the 5th Symposium Virtual Reality, Oct. 7-10, 2002, Fortaleza, CE, Brazil.
Berger, K., K. Ruhl, Y. Schroeder, C. Bruemmer, A. Scholz, M. A. Magnor, Markerless motion capture using multiple color-depth sensors, Proc. of the Vision, Modeling, and Visualization Workshop 2011, VMV 2011, Oct. 4-6, 2011, pp. 317-324, Berlin, Germany.
Bogomjakov, A., C. Gotsmann, M. Magnor, Free-viewpoint video from depth cameras, Proc. Vision, Modeling and Visualization, Nov. 2006, pp. 89-96.
Boukerche, A., R. Jarrar, R. W. Pazzi, A novel interactive streaming protocol for image-based 3D virtual environment navigation, Proc. of IEEE Int'l Conf. on Communications, ICC 2009, Jun. 14-18, 2009, pp. 1-6, Dresden, Germany.
Carranza, J., C. Theobalt, M. A. Magnor, H.-P. Seidel, Free-viewpoint video of human actors, ACM Trans. Graph., Jul. 2003, pp. 569-577, vol. 22, No. 3.
Deering, M., Geometry compression, Proc. of the 22nd Annual Conf. on Comp. Graphics and Interactive Techniques, SIGGRAPH 1995, Aug. 6-11, 1995, pp. 13-20, Los Angeles, CA, USA.
Do, L., S. Zinger, P.H.N. de With, Quality improving techniques for free-viewpoint DIBR, 3DTV-Conference: The True Vision Capture, Transmission and Display of 3D Video, May 4-6, 2009, pp. 1-4, Potsdam, Germany.
Eisemann, M., F. Klose, M. A. Magnor, Towards plenoptic Raumzeit reconstruction, Video Processing and Computational Video—International Seminar, Oct. 10-15, 2010, pp. 1-24, Dagstuhl Castle, Germany.
Eisert, P., Virtual video conferencing using 3D model-assisted image-based rendering, The 2nd IEE European Conf. on Visual Media Production, CVMP 2005, Nov. 30-Dec. 1, 2005, pp. 185-193.
Ekmekcioglu, E., B. Gunel, M. Dissanayake, S. T. Worrall, A. M. Kondoz, A scalable multi-view audiovisual entertainment framework with content-aware distribution, 17th IEEE Int'l Conf. on Image Processing, ICIP 2010, Sep. 26-29, 2010, pp. 2401-2404, Hong Kong.
Fitzgibbon, A. W., Y. Wexler, A. Zisserman, Image-based rendering using image-based priors, 9th IEEE Int'l Conf. on Comp. Vision, ICCV 2003, Oct. 14-17, 2003, pp. 1176-1183, Nice, France.
Grau, O., Multi-view 4D reconstruction of human action for entertainment applications, Research and Development White Paper, British Broadcasting Company, Nov. 2011, pp. 1-21.
Guillemaut, J.-Y., A. Hilton, Joint multi-layer segmentation and reconstruction for free-viewpoint video applications, Int'l J. of Comp. Vision, May 2011, pp. 73-100, vol. 93, No. 1.
Hornung, A., L. Kobbelt, Interactive pixel-accurate free viewpoint rendering from images with silhouette aware sampling, Comput. Graph. Forum, Dec. 2009, pp. 2090-2103, vol. 28, No. 8.

Kilner, J., J. Starck, A. Hilton, A comparative study of free-viewpoint video techniques for sports events, European Conf. on Visual Media Production, Nov. 29-30, 2006, pp. 87-96.
Kim, Y. M., D. Chan, C. Theobalt, S. Thrun, Design and calibration of a multi-view TOF sensor fusion system, IEEE Comp. Society Conf. on Comp. Vision and Pattern Recognition Workshops, CVPRW 2008, Jun. 23-28, 2008, pp. 1-7.
Kurashima, C. S., R. Yang, A. Lastra, Combining approximate geometry with view-dependent texture mapping—A hybrid approach to 3D video teleconferencing, 15th Brazilian Symposium on Comp. Graphics and Image Processing, SIBGRAPI 2002, Oct. 7-10, 2002, pp. 112-119, Fortaleza-CE, Brazil.
Kuster, C., T. Popa, C. Zach, C. Gotsman, M. H. Gross, FreeCam: A hybrid camera system for interactive free-viewpoint video, Proc. of the Vision, Modeling, and Visualization Workshop 2011, VMV 2011, Oct. 4-6, 2011, pp. 17-24, Berlin, Germany.
Lai, K.-K., Y.-L. Chan, C.-H. Fu, W.-C. Siu, Viewpoint switching in multiview videos using SP-frames, Proc. of the Int'l Conf. on Image Processing, ICIP 2008, Oct. 12-15, 2008, pp. 1776-1779, San Diego, California, USA.
Lamboray, E., S. Würmlin, M. Waschbüsch, M. H. Gross, H. Pfister, Unconstrained free-viewpoint video coding, Proc. of the 2004 Int'l Conf. on Image Processing, ICIP 2004, Oct. 24-27, 2004, pp. 3261-3264, Singapore.
Lei, C., Y.-H. Yang, Efficient geometric, photometric, and temporal calibration of an array of unsynchronized video cameras, Sixth Canadian Conf. on Comp. and Robot Vision, CRV 2009, May 25-27, 2009, pp. 162-169, Kelowna, British Columbia, Canada.
Lipski, C., C. Linz, K. Berger, A. Sellent, M. A. Magnor, Virtual video camera: Image-based viewpoint navigation through space and time, Comput. Graph. Forum, Dec. 2010, pp. 2555-2568, vol. 29, No. 8.
Liu, Y., Q. Dai, W. Xu, A point-cloud-based multiview stereo algorithm for free-viewpoint video, IEEE Trans. Vis. Comput. Graph., May/Jun. 2010, pp. 407-418, vol. 16, No. 3.
Liu, S., K. Kang, J.-P. Tarel, D. B. Cooper, Free-form object reconstruction from silhouettes, occluding edges and texture edges: A unified and robust operator based on duality, IEEE Trans. Pattern Anal. Mach. Intell., Jan. 2008, pp. 131-146, vol. 30, No. 1.
Lu, Z., Y.-W. Tai, M. Ben-Ezra, M. S. Brown, A framework for ultra high resolution 3D imaging, The Twenty-Third IEEE Conf. on Comp. Vision and Pattern Recognition, CVPR 2010, Jun. 13-18, 2010, pp. 1205-1212, San Francisco, CA, USA.
Morvan, Y., D. Farin, P. De With, System architecture for free-viewpoint video and 3D-TV, IEEE Transactions on Electronics, May 2008, pp. 925-932, vol. 54, No. 2.
Nabeshima, R., M. Ueda, D. Arita, R. Taniguchi, Frame rate stabilization by variable resolution shape reconstruction for on-line free-viewpoint video generation, Proc. of the 7th Asian Conf. on Comp. Vision, Jan. 13-16, 2006, pp. 81-90, Hyderabad, India.
Piatti, D., Time-of-flight cameras: Tests, calibration and multi-frame registration for automatic 3D object reconstruction, 2011, pp. 1-10.
Shi, S., W. J. Jeon, K. Nahrstedt, R. H. Campbell, Real-time remote rendering of 3D video for mobile devices, Proc. of the 17th Int'l Conf. on Multimedia 2009, ACM Multimedia 2009, Oct. 19-24, 2009, pp. 391-400, Vancouver, British Columbia, Canada.
Smolić, A., K. Müller, P. Merkle, T. Rein, M. Kautzner, P. Eisert, T. Wiegand, Free viewpoint video extraction, representation, coding, and rendering, Proc. of the 2004 Int'l Conf. on Image Processing, ICIP 2004, Oct. 24-27, 2004, pp. 3287-3290, vol. 5, Singapore.
Smolić, A., P. Kauff, Interactive 3D video representation and coding technologies, Invited Paper, Proc. of the IEEE, Special Issue on Advances in Video Coding and Delivery, Jan. 2005, pp. 98-110, vol. 93, No. 1.
Starck, J., J. Kilner, A. Hilton, A free-viewpoint video renderer, J. Graphics, GPU, & Game Tools, 2009, pp. 57-72, vol. 14, No. 3.
Kilner, J., J. Starck, J.-Y. Guillemaut, A. Hilton, Objective quality assessment in free-viewpoint video production, Sig. Proc.: Image Comm., Jan. 2009, pp. 3-16, vol. 24, No. 1-2.
Starck, J., J. Kilner, A. Hilton, Objective quality assessment in free-viewpoint video production, 3DTV Conf.: The True Vision—Capture, Transmission and Display of 3D Video, May 28-30, 2008, pp. 225-228, Istanbul, Turkey.

(56) References Cited

OTHER PUBLICATIONS

Theobalt, C., M. Li, M. A. Magnor, H.-P. Seidel, A flexible and versatile studio for synchronized multi-view video recording, Vision, Video, and Graphics, VVG 2003, Jul. 10-11th, 2003, pp. 9-16, University of Bath, UK.
Tian, D. P.-L. Lai, P. Lopez, C. Gomila, View synthesis techniques for 3D video, Proc. of the SPIE Applications of Digital Image Processing XXXII, Sep. 2009, pp. 74430T-74430T-11, vol. 7443.
Vertegaal, R., I. Weevers, C. Sohn, C. Cheung, Gaze-2: Conveying eye contact in group video conferencing using eye-controlled camera direction, Proc. of the 2003 Conf. on Human Factors in Computing Systems, CHI 2003, Apr. 5-10, 2003, pp. 521-528, Ft. Lauderdale, Florida, USA.
Wei, X., L. Yin, Z. Zhu, Q. Ji, Avatar-mediated face tracking and lip reading for human computer interaction, Proc. of the 12th ACM Int'l Conf. on Multimedia, ACM Multimedia 2004, Oct. 10-16, 2004, pp. 500-503, New York, NY, USA.
Wikipedia, Hidden surface determination, Apr. 23, 2012, pp. 1-4.
Würmlin, S., E. Lamboray, M. Waschbüsch, M. Gross, Dynamic point samples for free-viewpoint video, Proc. of the Picture Coding Symposium, Dec. 15-17, 2004, pp. 6, San Francisco, CA.
Würmlin, S., E. Lamboray, M. Waschbüsch, P. Kaufman, A. Smolić, M. Gross, Image-space free-viewpoint video, Vision, Modeling, and Visualization, VMV 2005, Nov. 16-18, 2005, pp. 453-460, Erlangen, Germany.
Yea, S., A. Vetro, View synthesis prediction for multiview video coding, Sig. Proc.: Image Comm., Jan. 2009, pp. 89-100, vol. 24, No. 1-2.
Yea, S., A. Vetro, View synthesis prediction for rate-overhead reduction in FTV, 3DTV Conf.: The True Vision—Capture, Transmission and Display of 3D Video, May 28-30, 2008, pp. 145-148, Istanbul, Turkey.
Zhu, Y., A novel view multi-view synthesis approach for free viewpoint video, Int'l Joint Conf. on Artificial Intelligence, JCAI '09, Apr. 25-26, 2009, pp. 88-91, Hainan Island, China.
Ziegler, G., H. P. A. Lensch, M. Magnor, H.-P. Seidel, Multi-video compression in texture space using 4D SPIHT, 2004 IEEE 6th Workshop on Multimedia Signal Processing, Sep. 29-Oct. 1, 2004, pp. 39-42, MPI Informatik, Saarbrucken, Germany.
Zitnick, C. L., S. B. Kang, M. Uyttendaele, S. A. J. Winder, R. Szeliski, High-quality video view interpolation using a layered representation, ACM Trans. Graph., Aug. 2004, pp. 600-608, vol. 23, No. 3.
Cooper, O. D., Robust generation of 3D models from video footage of urban scenes, Ph.D Thesis, University of Bristol, Mar. 2005.
Gautier, J., E. Bosc, L. Morin, Representation and coding of 3D video data, Nov. 17, 2010, pp. 1-43.
Goldlücke, B., Multi-camera reconstruction and rendering for free-viewpoint video, Ph.D. Thesis, Nov. 29, 2006, pp. 1-164, Max-Planck-Institut für Informatik.
Li, W., Free viewpoint video with image-based rendering, Ph.D Dissertation, May 2010, pp. 1-151, Arizona State University.
Pollefeys, M., D. Nistér, J.-M. Frahm, A. Akbarzadeh, P. Mordohai, B. Clipp, C. Engels, D. Gallup, S. J. Kim, P. Merrell, C. Salmi, S. N. Sinha, B. Talton, L. Wang, Q. Yang, H. Stewénius, R. Yang, G. Welch, H. Towles, Detailed real-time urban 3D reconstruction from video, Int'l J. of Comp. Vision, Jul. 2008, pp. 143-167, vol. 78, No. 2-3.
Sugden, B., M. Iwanicki, Mega meshes: Modelling, rendering and lighting a world made of 100 billion polygons, Game Developers Conf., Feb. 28-Mar. 4, 2011, pp. 1-67, San Francisco, CA.
Matthies, L., M. Okutomi, A Bayesian foundation for active stereo vision, Proc. of SPIE Conf. 1198, Sensor Fusion II: Human and Machine Strategies, Nov. 1989, pp. 62-74.
Rankin, A. L., C. F. Bergh, S. B. Goldberg, P. Bellutta, A. Huertas, L. H. Matthies, Passive perception system for day/night autonomous off-road navigation, Proc. SPIE, Jun. 2, 2005, vol. 5804, Unmanned Ground Vehicle Technology VII, pp. 343-358.
Würmlin, S., E. Lamboray, M. Gross, 3D video fragments: Dynamic point samples for real-time free-viewpoint video, Computers and Graphics,Feb. 2004, vol. 28, No. 1, pp. 3-14.
Yang, Yi, U.S. Final Office Action, U.S. Appl. No. 13/566,796, dated Sep. 5, 2014, pp. 1-13.
Hajnik, Daniel F., U.S. Office Action, U.S. Appl. No. 13/599,170, dated Sep. 30, 2014, pp. 1-25.
Cain, Leon T., U.S. Office Action, U.S. Appl. No. 13/614,852, dated Oct. 31, 2014, pp. 1-19.
Cooke et al., Multiple image view synthesis for free viewpoint video applications, IEEE International Conference on Image Processing, Sep. 2005, vol. 1, pp. 1-4.
Mathis, Normal map workflow, Oct. 18, 2005, http://www.poopinmymouth.com/tutorial/normal_workflow.htm.
Miller, G., High quality novel view rendering from multiple cameras, Doctor of Philosophy, University of Surrey, Centre for Vision, Speech and Signal Processing, School of Electronics and Physical Sciences, Dec. 2007, pp. 1-173.
Zinger, Free-viewpoint depth image based rendering, Preprint submitted to Visual Communication and Image Representation, Jun. 26, 2009, pp. 1-27.
Yang, Yi, U.S. Office Action, U.S. Appl. No. 13/566,796, dated Feb. 12, 2015, pp. 1-12.
Wu, Chong, U.S. Office Action, U.S. Appl. No. 13/744,885, dated Feb. 12, 2015, pp. 1-19.
Nguyen, Kimbinh, U.S. Office Action, U.S. Appl. No. 13/599,436, dated Mar. 2, 2015, pp. 1-17.
Joshi, Sunita, U.S. Office Action, U.S. Appl. No. 13/599,678, dated Apr. 1, 2015, pp. 1-32.
Hajnik, Daniel F., U.S. Final Office Action, U.S. Appl. No. 13/599,170, dated Jan. 27, 2015, pp. 1-29.
Abimbola, Kehinde, U.S. Office Action, U.S. Appl. No. 13/588,917, dated Mar. 4, 2015, pp. 1-36.
Hajnik, Daniel F., U.S. Final Office Action, U.S. Appl. No. 13/599,170, dated Apr. 29, 2016, pp. 1-14.
Funkhouser, T. A., C. H. Séquin, Adaptive display algorithm for interactive frame rates during visualization of complex virtual environments, Proc. of the 20th Annual Conf. on Comp. Graphics and Interactive Techniques, Aug. 1993, pp. 247-254, ACM.
Nguyen, Phung Hoang Joseph, U.S. Notice of Allowance, dated U.S. Appl. No. 14/873,190, Jan. 7, 2016, pp. 1-11.
Ma, Tize, U.S. Office Action, U.S. Appl. No. 13/598,536, dated Mar. 10, 2016, pp. 1-24.
Wu, Chong, U.S. Office Action, U.S. Appl. No. 13/744,885, dated Mar. 10, 2016, pp. 1-18.
He, Weiming, U.S. Office Action, U.S. Appl. No. 13/790,158, dated Dec. 24, 2015, pp. 1-31.
He, Weiming, U.S. Final Office Action, U.S. Appl. No. 13/790,158, dated Mar. 21, 2016, pp. 1-32.
Joshi, Sunita, U.S. Notice of Allowance, U.S. Appl. No. 13/599,678, dated Jan. 22, 2016, pp. 1-6.
Hajnik, Daniel F., U.S. Office Action, U.S. Appl. No. 13/599,170, dated Feb. 22, 2016, pp. 1-12.
Abimbola, Kehinde, U.S. Notice of Allowance, U.S. Appl. No. 13/588,917, dated Jan. 21, 2016, pp. 1-6.
Petit, B., J.-D. Lesage, C. Menier, J. Allard, J.-S. Franco, B. Raffin, E. Boyer, F. Faure, Multicamera Real-Time 3D Modeling for Telepresence and Remote Collaboration, Int'l J. of Digital Multimedia Broadcasting, 2010, vol. 2010, pp. 1-12. (the year of publication is sufficiently earlier than the effective U.S. filing date and any foreign priority date so that the particular month of publication is not in issue).
Roberts, M., A work-efficient GPU algorithm for level set segmentation, High Performance Graphics, Jun. 25-27, 2010, https://vimeo.com/24167006.
Ma, Tize, U.S. Final Office Action, U.S. Appl. No. 13/598,536, dated Nov. 3, 2015, pp. 1-20.
Satti, Humam M., U.S. Office Action, U.S. Appl. No. 13/598,747, dated Oct. 8, 2015, pp. 1-9.
Wu, Chong, U.S. Final Office Action, U.S. Appl. No. 13/744,885, dated Aug. 13, 2015, pp. 1-30.

(56) References Cited

OTHER PUBLICATIONS

He, Weiming, U.S. Final Office Action, U.S. Appl. No. 13/790,158, dated Aug. 13, 2015, pp. 1-31.
Cain, Leon T., U.S. Notice of Allowance, U.S. Appl. No. 13/614,852, dated Oct. 1, 2015, pp. 1-5.
Nguyen, Kimbinh, U.S. Notice of Allowance, U.S. Appl. No. 13/599,436, dated Oct. 13, 2015, pp. 1-5.
Joshi, Sunita, U.S. Office Action, U.S. Appl. No. 13/599,678, dated Aug. 17, 2015, pp. 1-26.
Hajnik, Daniel F., U.S. Final Office Action, U.S. Appl. No. 13/599,170, dated Oct. 20, 2015, pp. 1-13.
Abimbola, Kehinde, U.S. Notice of Allowance, U.S. Appl. No. 13/588,917, dated Sep. 2, 2015, pp. 1-8.
Kurutepe, E., Civanlar, M.R., Tekalp, A.M., Client-driven selective streaming of multiview video for interactive 3DTV, IEEE Transactions on Circuits and Systems for Video Technology, Nov. 2007, vol. 17, No. 11, pp. 1558-1565.
Yang, Z., Yu, B., Nahrstedt, K., Bajscy, R., A multi-stream adaptation framework for bandwidth management in 3D tele-immersion, May 2006, Proc. Of the 2006 Int'l Workshop on Network and operating systems support for digital audio and video, pp. 14.
Nguyen, Phung Hoang Joseph, U.S. Office Action, U.S. Appl. No. 13/602,097, dated Jun. 1, 2015, pp. 1-9.
Ma, Tze, U.S. Office Action, U.S. Appl. No. 13/598,536, dated Jun. 26, 2015, pp. 1-16.
Yang, Yi, U.S. Final Office Action, U.S. Appl. No. 13/566,796, dated Jun. 30, 2015, pp. 1-13.
He, Weiming, U.S. Office Action, U.S. Appl. No. 13/790,158, dated Apr. 28, 2015, pp. 1-27.
Cain, Leon T., U.S. Final Office Action, U.S. Appl. No. 13/614,852, dated Apr. 30, 2015, pp. 1-23.
Nguyen, Kimbinh, U.S. Final Office Action, U.S. Appl. No. 13/599,436, dated Jun. 19, 2015, pp. 1-20.
Hajnik, Daniel F., U.S. Office Action, U.S. Appl. No. 13/599,170, dated May 18, 2015, pp. 1-25.

\* cited by examiner

AUTOMATED CAMERA ARRAY CALIBRATION

This application claims the benefit and priority of a prior provisional U.S. application entitled "INTERACTIVE SPATIAL VIDEO" which was assigned Ser. No. 61/653,983 and was filed May 31, 2012.

BACKGROUND

State of the art approaches to camera array calibration currently include various techniques such as, for example, using a two dimensional (2D) planar object to calibrate sets of cameras that can see the whole 2D surface. This technique is common for calibrating stereo pairs. Another camera array calibration technique uses a one dimensional (1D) object such as a light to calibrate an array of sensors/cameras, provided that all cameras can see the light. Yet another calibration method includes using Structure from Motion (SFM), a process of finding the three-dimensional structure of an object by analyzing local motion signals over time, for both fixed and moving cameras.

Accurate calibration for all sensors capturing a scene to create a three dimensional spatial video such as, for example, a Free Viewpoint Video (FVV), is important for achieving realistic depictions of synthetic scenes created from the sensor data. FVV is created from images captured by multiple cameras viewing a scene from different viewpoints and allows a user to look at a scene from synthetic viewpoints that are created from the captured images and to navigate around the scene.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In general, the automated camera array calibration technique described herein calibrates sensors (e.g., cameras) of an array used to record a three dimensional spatial video, such as, for example, a FVV. Newer hybrid capture devices that can be used to capture images to create three dimensional spatial video include sensors that can generate both red, green, blue (RGB) data (or data in other spectral ranges) of a scene, as well as corresponding depth maps that contain information relating to the distances of surfaces of the scene from a given viewpoint. The automated camera array calibration technique described herein leverages both depth map data and single or multi-spectral intensity data (e.g., RGB data, monochromatic data) to automatically determine the camera geometry at any given point in time. It should be noted that although the following description of some embodiments of the technique refer to RGB data, it is to be understood that the technique can be used with any single or multi-spectral intensity data in place of the referenced RGB data.

More specifically, one exemplary embodiment of the automated camera array calibration technique described herein employs the following process to calibrate the cameras or sensors of an array that captures a scene in 3D space. The technique employs hybrid capture devices which can capture not only RGB data, but also corresponding depth data. If the cameras are not synchronized or genlocked, only non-moving elements of a scene are used to perform the calibration. Therefore, if the hybrid capture devices are not temporally synchronized, the moving and non-moving data or elements of the captured scene are separated, and only the non-moving data/elements of the captured scene are used for calibration purposes. In order to calibrate the cameras of an array of hybrid capture devices, the common features are found in the depth maps of pairs of hybrid capture devices and a rough calibration based on shared depth map features is derived. For example, this rough calibration can be derived using an Iterative Closest Point (ICP) method which is a popular method for aligning meshes and contours in computer graphics. Once the rough calibration is found, the RGB data, whose relation to the depth data is approximately known from calibration of the depth sensor/RGB camera in the manufacture of the hybrid capture device, is used to refine the rough calibration. To this end, features in each RGB image captured using a current hybrid capture device are projected onto a RGB image of another hybrid capture device using the extrinsic calibration data obtained from matching the depth maps and the relation between the RGB and depth sensors determined during manufacture. The rough calibration is then refined by matching the RGB features in an RGB image captured by the current hybrid capture device to RGB features in an RGB image captured by another hybrid capture device. The initial RGB feature matching is done by projecting depth features into two RGB images and computing a matching score between the depth features and the RGB features in each of the two RGB images. Matching scores below a prescribed threshold are accepted into the initial set of RGB feature points for each RGB image. Refinement proceeds by alternating estimation of calibration parameters and projection and matching of the RGB feature points in the RGB images. The result is refined calibration data.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the automated camera array calibration technique, reference is made to the accompanying drawings, which form a part thereof, and which show by way of illustration examples by which the automated camera array calibration technique described herein may be practiced. It is to be understood that other embodiments may be utilized and structural changes may be made without departing from the scope of the claimed subject matter.

1.0 Automated Camera Array Calibration Technique

The following sections provide background information and an overview of the automated camera array calibration technique, as well as exemplary processes and an exemplary architecture for practicing the technique. A description of a possible usage scenario is also provided.

It is also noted that for the sake of clarity specific terminology will be resorted to in describing the pipeline technique embodiments described herein and it is not intended for these embodiments to be limited to the specific terms so chosen. Furthermore, it is to be understood that each specific term includes all its technical equivalents that operate in a broadly similar manner to achieve a similar purpose. Reference herein to "one embodiment", or "another embodiment", or an "exemplary embodiment", or an "alternate embodiment", or "one implementation", or "another implementation", or an "exemplary implementation", or an "alternate implementation" means that a particular feature, a particular structure, or particular characteristics described in connection with the embodiment or implementation can be included in at least one embodiment of the pipeline technique. The appearances of the phrases "in one embodiment", "in another embodiment", "in an exemplary embodiment", "in an alternate embodiment", "in one implementation", "in another implementation", "in an exemplary implementation", and "in an alternate implementation" in various places in the specification are not necessarily all referring to the same embodiment or implementation, nor are separate or alternative embodiments/implementations mutually exclusive of other embodiments/implementations. Yet furthermore, the order of process flow representing one or more embodiments or implementations of the pipeline technique does not inherently indicate any particular order not imply any limitations of the pipeline technique.

The term "sensor" is used herein to refer to any one of a variety of scene-sensing devices which can be used to generate a sensor data that represents a given scene. Each of the sensors can be any type of video capture device (e.g., any type of video camera).

1.1 Background

The intrinsic and extrinsic calibration of multiple sensors filming the same scene in the creation of three dimensional spatial video, such as, for example, Free Viewpoint Video (FVV) is a substantial problem with a host of challenges. First, image and related sensors are very small and therefore even small movements at a sensor level can lead to entirely different images. Second, when multiple sensors are calibrated, one miscalibrated sensor can cause data from the entire recording array to be faulty. Third, the use of moving, zooming, or focusing cameras leads to additional problems in determining camera position in time relative to a moving scene. Finally, calibration procedures used in creating a FVV are typically administered by trained experts (not general consumers), often multiple times, to get a specific sensor array accurately calibrated. These issues are not conducive to the creation of a commercially viable system for recording and creating FVV.

1.2 Overview of the Technique

Calibration of multiple sensors (e.g., cameras) filming the same scene such as the sensors used for creating Free Viewpoint Video (FVV) poses special challenges. The automated camera array calibration technique described herein is a technique for calibrating sensors/cameras of an array, such as the type of array used to record image data to create a FVV. The technique employs hybrid capture devices that include sensors that can generate both traditional single or multi-spectral intensity data, such as RGB data, as well as corresponding depth maps that describe a scene. Although the following description refers to RGB data, those with ordinary skill in the art will appreciate that any color space or single and multi-spectral intensity data can be used. Because the hybrid capture devices are typically manufactured as a unit, the relationship between the intensity (e.g. RGB) data and depth map are approximately calibrated at the factory, so the relationship between the depth measuring device and the cameras are known. Many scenarios involving the creation of FVV, such as ones where consumers record and create FVV at home, are not conducive to complicated and sensitive calibration routines. As such, when hybrid capture devices are used to record data for a FVV, the automated camera array calibration technique described herein leverages both depth and intensity (e.g., RGB) data to automatically determine the camera geometry for multiple cameras at any given point in time.

The automated camera array calibration technique provides various methods for automatically calibrating the intrinsic, extrinsic, and distortion parameters of a sparse collection of combination single or multi-spectral (e.g., RGB) and depth (e.g., RGBD) sensors. Intrinsic parameters can include the focal length, principal point, skew coefficient, and distortions of a given sensor. Extrinsic parameters can include both rotations and translations which detail the spatial location of the sensor as well as the direction the sensor is pointing. Calibration is typically a time-consuming process that requires an expert. Often times the expert must capture a series of images of a specific calibration device. In contrast, the present automated camera array calibration technique calibrates the sensors automatically, without any user intervention.

In one embodiment, the automated camera array calibration technique assumes that the RGB and depth sensors are in a single RGBD (red, green, blue and depth) unit and are at least approximately calibrated during production. It is expected that the depth sensor (if it is not optically co-located with the RGB sensor) can obtain depth and intensity images. In one embodiment, the automated camera array calibration technique is designed with FVV applications in mind, and as such the technique requires a common capture volume. The common capture volume is used to ensure that all of the cameras/sensors are viewing the same scene and is defined by the intersection of the RGBD sensor/camera frustums of the cameras/sensors of the array. The common capture volume should be large enough to cover a significant percentage of each device's image sensors. If this is not the case, the user can elect to scan the union of capture volumes with one of the RGBD sensors (e.g., hybrid capture devices), before returning that sensor to its desired position. Note that the depth sensor may actually be a set of stereo cameras. If this is the case, it is expected that the stereo cameras are calibrated well enough to compute an initial depth map.

An overview of the technique having been provided the following section provides some exemplary processes for practicing the automated camera calibration technique.

1.3 Exemplary Processes

Figure 1:
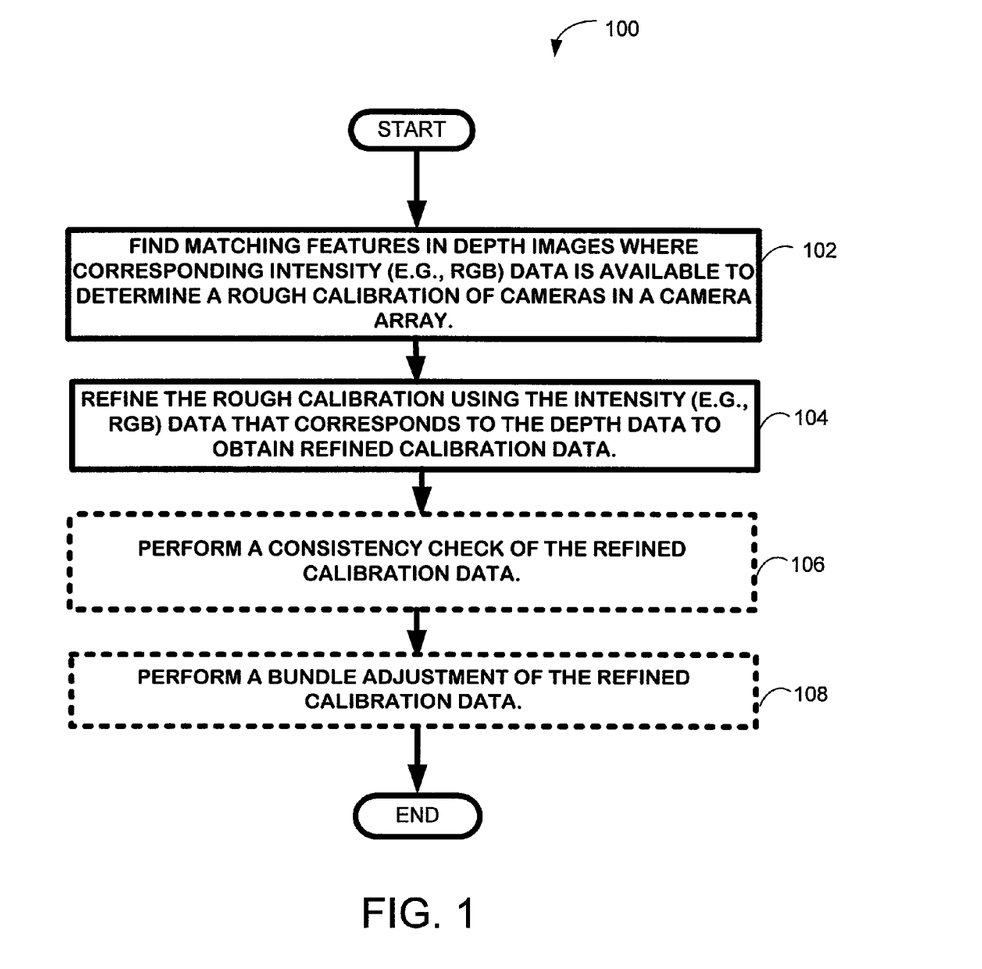
FIG. 1 depicts a flow diagram of an exemplary process of the automated camera array calibration technique described herein.

FIG. 1 depicts a very general exemplary computer-implemented process 100 for calibrating an array of sensors/cameras. This embodiment finds matching features in depth maps where single or multi-spectral intensity (e.g., RGB) data corresponding to the depth maps is available, and uses the matching features in the depth maps, to obtain a rough calibration of sensors in a sensor array, as shown in block 102. For example, the rough calibration can be found using a conventional Integrated Closest Point (ICP) method. As shown in block 104, the rough calibration is then refined by finding feature points in intensity (e.g., RGB) images that correspond to the depth maps and matching these feature points in the intensity (e.g., RGB) images to obtain refined calibration data. The refined calibration data can optionally be checked, as shown in block 106. For example, this can be done by verifying matching RGB feature points and discarding non-matching feature points. A bundle adjustment can then optionally be performed to further optimize the refined calibration results, as shown in block 108. If the refined calibration data is checked, and the non-matching feature points are discarded, only the non-discarded feature points are sent to the bundle adjustment.

Figure 2:
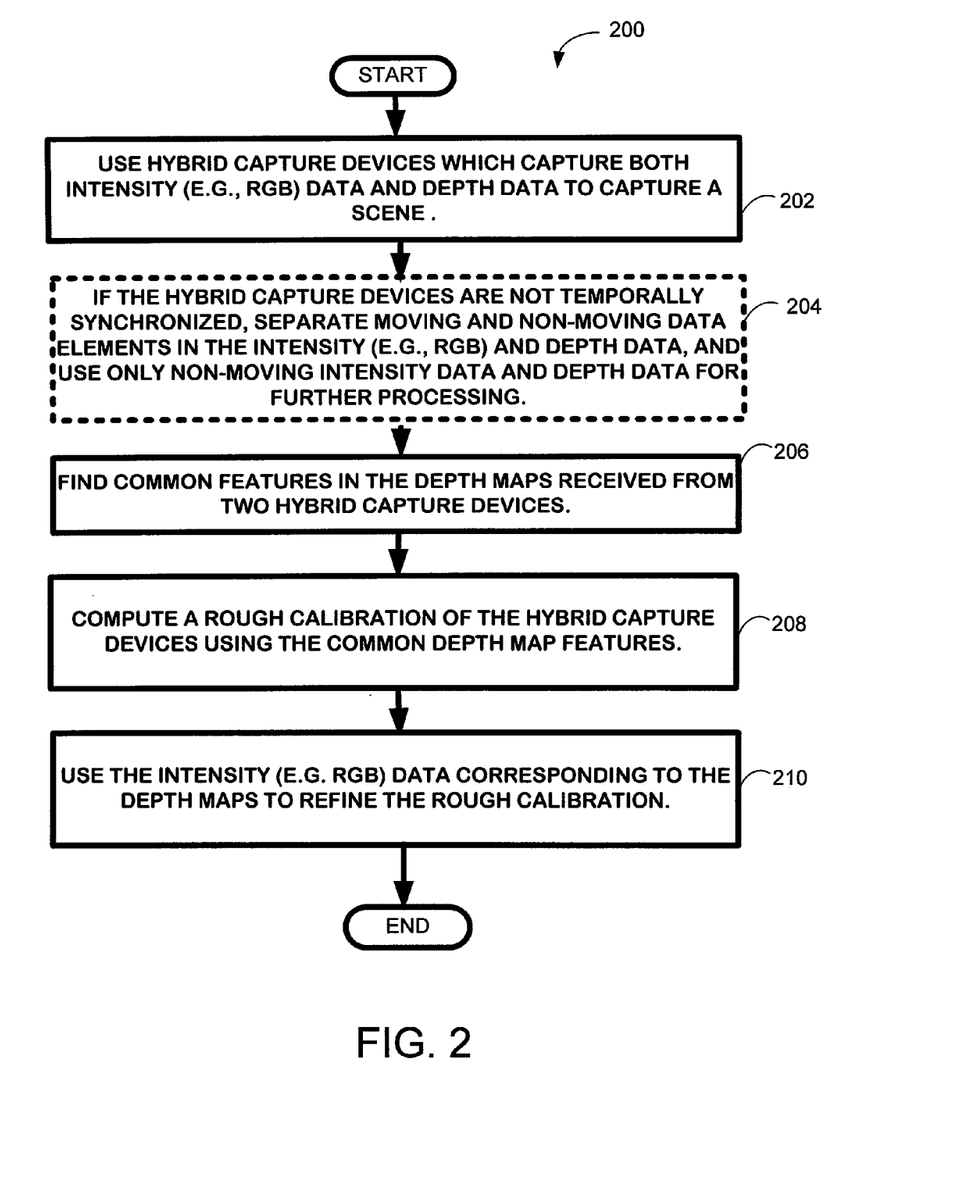
FIG. 2 depicts another flow diagram of another exemplary process of the automated camera array calibration technique described herein.

FIG. 2 depicts another, more detailed, exemplary computer-implemented process 200 for calibrating a sensor/camera array according to the automated camera array calibration technique. As shown in FIG. 2, block 202, the technique employs hybrid capture devices which capture not only single or multi-spectral intensity (e.g., RGB) data, but also corresponding depth data of a scene. For example, such a hybrid capture device might include two IR cameras which can be used to capture depth images and a RGB camera which can be used to capture RGB images. The captured data (RGB and/or depth data) can optionally be down sampled prior to further processing in order to more quickly calibrate the sensors/cameras of the array.

As shown in block 204, if the hybrid capture devices are not temporally synchronized, the moving and non-moving data elements of the scene are separated. This separation or segmentation can be done in a variety of conventional ways. For example, moving and static objects are separated by comparing sequences of frames to find which elements stay in the same place. This can be done, for example, by using an optical flow technique or a low rank estimation technique. If the hybrid capture devices are not temporally synchronized, only the non-moving data elements are used for calibration of the array. Common features are found in the depth maps of two hybrid capture devices capturing the same scene, as shown in block 206. A rough extrinsic calibration based on shared depth map features of the two depth maps is derived, as shown in block 208. For example, the rough calibration can be found using an ICP method.

Once the rough calibration is found, the single or multi-spectral intensity (e.g., RGB) data can be used to refine the rough calibration, as shown in block 210. For example, this can be done by, for each single or multi-spectral intensity (e.g., RGB) image captured using a current hybrid capture device, identifying features in the intensity (e.g., RGB) image and projecting each feature onto an intensity (e.g., RGB) image of another hybrid capture device using the rough calibration data obtained from matching the depth maps. The rough calibration is then refined by matching the intensity (e.g., RGB) features in the intensity (e.g, RGB) image captured by the current hybrid capture device to intensity (e.g., RGB) features in the intensity (e.g., RGB) image captured by the other hybrid capture device. The initial RGB feature matching is done by projecting depth features into two RGB images and computing a matching score between the depth features and the RGB features in each of the two RGB images. Matching scores below a prescribed threshold are accepted into the initial set of RGB feature points for each RGB image. Refinement proceeds by alternating estimation of calibration parameters and projection and matching of the RGB feature points in the RGB images. A consistency check and a bundle adjustment can also optionally be performed to improve the calibration result in this embodiment.

It should be noted that the process actions described in blocks 204 through 210 can be iteratively repeated with less down sampled depth and/or RGB images to obtain finer calibration results.

It should be noted that, in the event the fully automatic method of camera/sensor calibration fails, a user can scan the scene with one camera by hand. In this case a model of the scene is built using images from the single camera. Then a rough calibration is computed by comparing the depth map and/or intensity images captured by each camera against the created model, not the depth and/or intensity data captured by the other cameras.

Exemplary processes for practicing the automated camera array calibration technique having been described, the following section discusses an exemplary architecture for practicing the technique.

1.4 Exemplary Architecture

Figure 3:
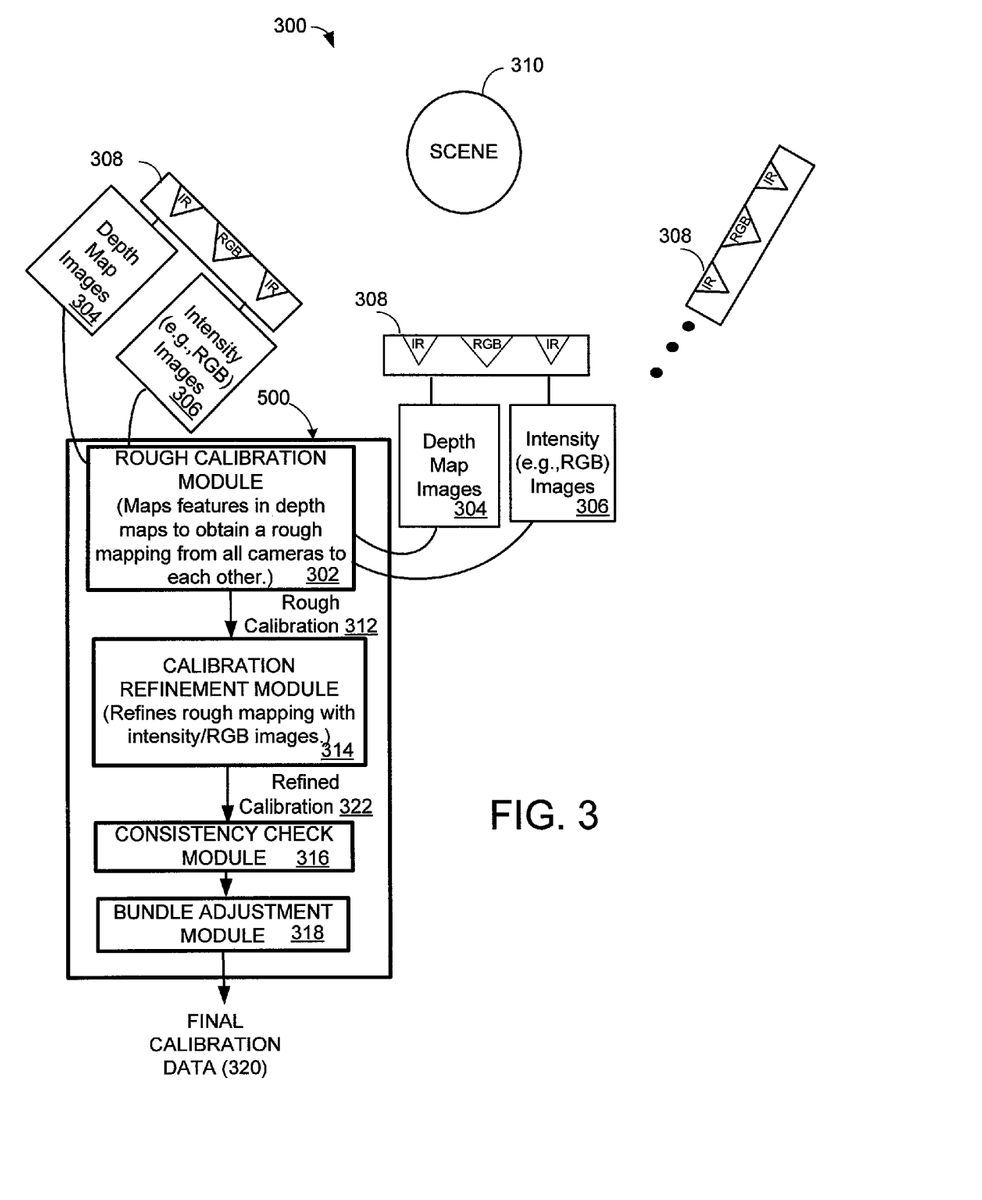
FIG. 3 is an exemplary architecture for practicing one exemplary embodiment of the automated camera array calibration technique described herein.

FIG. 3 shows an exemplary architecture 300 for employing one embodiment of the automated camera array calibration technique. As shown in FIG. 3, this exemplary architecture 300 includes a rough calibration module 302 which resides on a general purpose computing device 500, such as will be described in greater detail with respect to FIG. 5. Corresponding depth data 304 and RGB data 306 from multiple hybrid capture devices 308 simultaneously capturing a scene 310 from different viewpoints are input into the rough calibration module 302. The rough calibration module 302 determines a rough calibration 312 of the multiple hybrid capture devices 308 using only the corresponding depth data 304 obtained from the capture devices 308. As discussed previously, this rough calibration can be achieved by using an ICP method. A calibration refinement module 316 refines the rough calibration 312 using the RGB data 306 corresponding to the depth maps 304 obtained from the hybrid capture devices 308. For example, features in each RGB image captured using a current hybrid capture device are projected onto a RGB image of another hybrid capture device using the rough calibration data obtained from matching the depth maps. The rough calibration data is then refined by matching the RGB features in the RGB image captured by the current hybrid capture device to RGB features in the RGB image captured by the other hybrid capture device. The initial RGB feature matching is done by projecting depth features into two RGB images and computing a matching score. Scores below a threshold are accepted into the initial set. Refinement proceeds by alternating estimation of calibration parameters and projection of the feature points in the images. The refined calibration data 322 can be input into a consistency check module 316 that checks the matched RGB feature points and discards non-matching feature points. The refined calibration data can then be put in a bundle adjustment module 318 to optimize the final extrinsic calibration data 320.

1.5 Exemplary Usage Scenario

The automated camera array calibration technique can be used in various scenarios with any Freepoint Viewpoint Video system. One way the technique can be used is in calibrating an array of sensors/cameras for a system for generating Spatial Video (SV) described below. Spatial Video (SV) provides a next generation, interactive, and immersive video experiences relevant to both consumer entertainment and telepresence, leveraging applied technologies from Free Viewpoint Video (FVV). As such, SV encompasses a commercially viable system that supports features required for capturing, processing, distributing, and viewing any type of FVV media in a number of different product configurations.

1.5.1 Spatial Video Pipeline

Figure 4:
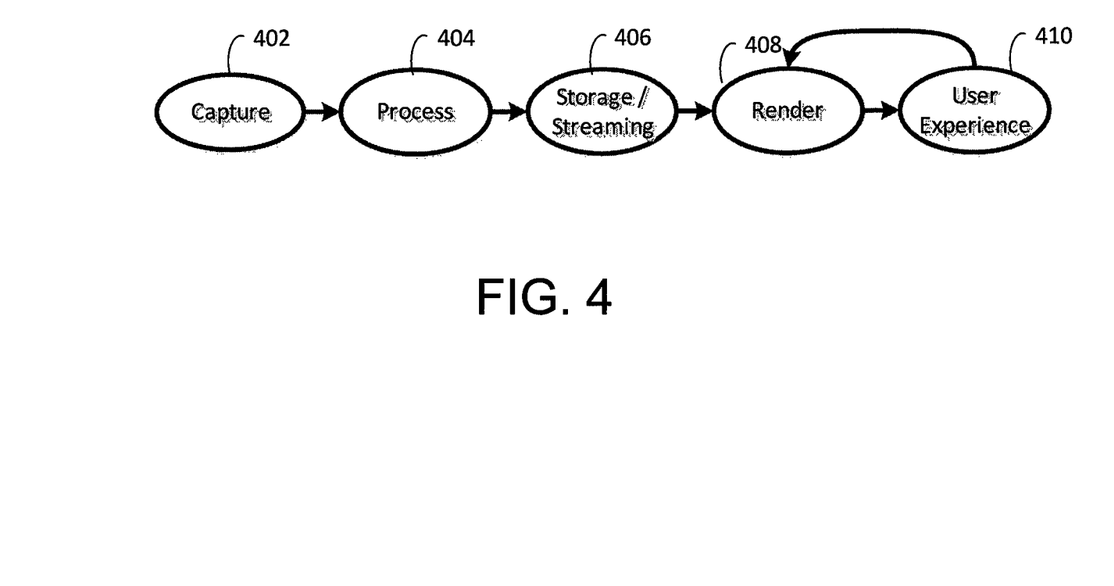
FIG. 4 depicts an exemplary spatial video pipeline in which the automated camera array calibration technique described herein can be practiced.

SV employs an end to end processing and playback pipeline for any type of FVV that can be captured. Such a pipeline 400 is shown in FIG. 4, the essential components of which include: Capture 402; Process 404; Storage/Streaming 406; Render 408; and the User Experience 410.

The SV Capture 402 stage of the pipeline supports any hardware used in an array to record a FVV scene. This includes the use of various different kinds of sensors (including video cameras and audio) for recording data. When sensors are arranged in 3D space relative to a scene, their type, position, and orientation is referred to as the camera geometry. The SV pipeline generates the calibrated camera geometry for static arrays of sensors as well as for moving sensors at every point in time during the capture of a FVV. The SV pipeline is designed to work with any type of sensor data from an any kind of an array, including but not limited to RGB data from traditional cameras, RGB data from light field cameras, IR data from IR optimized cameras (including the use of structured light such as with Microsoft® Corporation's Kinect™), monochromatic cameras, or time of flight (TOF) sensors that generate depth maps and RGB data directly. The SV pipeline is able to determine the intrinsic and extrinsic characteristics of any sensor in the array at any point in time. Intrinsic parameters such as the focal length, principal point, skew coefficient, and distortions are required to understand the governing physics and optics of a given sensor. Extrinsic parameters include both rotations and translations which detail the spatial location of the sensor as well as the direction the sensor is pointing. Typically, a calibration setup procedure is carried out that is specific to the type, number, and placement of sensors. This data is often recorded in one or more calibration procedures prior to recording a specific FVV. If so, this data is imported into the SV pipeline in addition to any data recorded w/ the sensor array.

The SV Process 404 stage of the pipeline takes sensor data and extracts 3D geometric information that describes the recorded scene both spatially and temporally. Different types of 3DR algorithms are used depending on: the number and type of sensors, the input camera geometry, and whether processing is done in real time or asynchronously from the playback process. The output of the process stage is various geometric proxies which describe the scene as a function of time. Unlike video games or special effects technology, 3D geometry in the SV pipeline is created using automated computer vision 3DR algorithms with no human input required.

SV Storage and Streaming 406 methods are specific to different FVV product configurations, and these are segmented as: bidirectional live applications of FVV in telepresence, broadcast live applications of FVV, and asynchronous applications of FVV. Depending on details associated with these various product configurations, data is processed, stored, and distributed to end users in different manners.

The SV Render 408 stage is based on image based rendering (IBR), since synthetic, or virtual, viewpoints of the scene are created using real images and different types of 3D geometry. SV render 408 uses different IBR algorithms to render synthetic viewpoints based on variables associated with the product configuration, hardware platform, scene complexity, end user experience, input camera geometry, and the desired degree of viewpoint navigation in the final FVV. Therefore, different IBR algorithms are used in the SV Rendering stage to maximize photorealism from any necessary synthetic viewpoints during end user playback of a FVV.

The SV User Experience 410 processes data so that navigation is possible with up to 6 degrees of freedom (DOF) during FVV playback. In non-live applications, temporal navigation is possible as well—this is spatiotemporal (or space-time) navigation. Viewpoint navigation means users can change their viewpoint (what is seen on a display interface) in real time, relative to moving video. In this way, the video viewpoint can be continuously controlled or updated during playback of a FVV scene.

Figure 5:
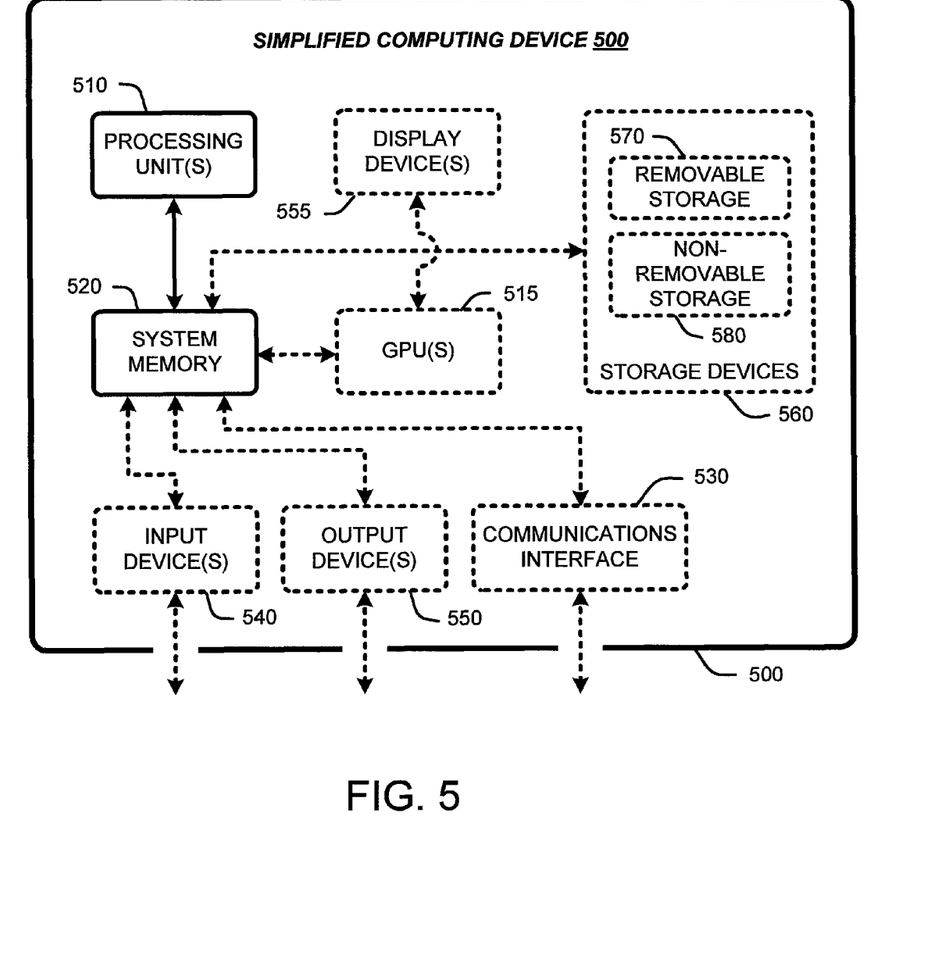
FIG. 5 is a schematic of an exemplary computing environment which can be used to practice the automated camera array calibration technique.

2.0 Exemplary Operating Environments:

The automated camera array calibration technique described herein is operational within numerous types of general purpose or special purpose computing system environments or configurations. FIG. 5 illustrates a simplified example of a general-purpose computer system on which various embodiments and elements of the automated camera array calibration technique, as described herein, may be implemented. It should be noted that any boxes that are represented by broken or dashed lines in FIG. 5 represent alternate embodiments of the simplified computing device, and that any or all of these alternate embodiments, as described below, may be used in combination with other alternate embodiments that are described throughout this document.

For example, FIG. 5 shows a general system diagram showing a simplified computing device 500. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the automated camera array calibration technique, the device should have a sufficient computational capability and system memory to enable basic computational operations. In particular, as illustrated by FIG. 5, the computational capability is generally illustrated by one or more processing unit(s) 510, and may also include one or more GPUs 515, either or both in communication with system memory 520. Note that that the processing unit(s) 510 of the general computing device may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 5 may also include other components, such as, for example, a communications interface 530. The simplified computing device of FIG. 5 may also include one or more conventional computer input devices 540 (e.g., pointing devices, keyboards, audio input devices, video input devices, haptic input devices, devices for receiving wired or wireless data transmissions, etc.). The simplified computing device of FIG. 5 may also include other optional components, such as, for example, one or more conventional computer output devices 550 (e.g., display device(s) 555, audio output devices, video output devices, devices for transmitting wired or wireless data transmissions, etc.). Note that typical communications interfaces 530, input devices 540, output devices 550, and storage devices 560 for general-purpose computers are well known to those skilled in the art, and will not be described in detail herein.

The simplified computing device of FIG. 5 may also include a variety of computer readable media. Computer readable media can be any available media that can be accessed by computer 500 via storage devices 560 and includes both volatile and nonvolatile media that is either removable 570 and/or non-removable 580, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the automated camera array calibration technique described herein, or portions thereof, may be stored, received, transmitted, or read from any desired combination of computer or machine readable media or storage devices and communication media in the form of computer executable instructions or other data structures.

Finally, the automated camera array calibration technique described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A computer-implemented process for calibrating an array of capture devices, comprising the process actions of:
    using hybrid capture devices, which capture both intensity data and depth data, to simultaneously capture depth maps and corresponding intensity images of a scene;
    finding common features in the depth maps from two hybrid capture devices;
    automatically computing a rough calibration of extrinsic parameters of the hybrid capture devices, comprising both rotations and translations which detail the spatial location of each of the hybrid capture devices as well as the direction that the hybrid capture device is pointing using the shared depth map features.

2. The computer-implemented process of claim 1, further comprising the process actions of:
    if the hybrid capture devices are not temporally synchronized,
        separating the moving and non-moving data of the scene in the depth images and intensity images of the scene; and
        using only the non-moving data of the scene for finding the common features.

3. The computer-implemented process of claim 1 wherein the depth maps are down sampled prior to finding the common features.

4. The computer-implemented process of claim 1, wherein once the rough calibration is found, the intensity data is used to refine the rough calibration.

5. The computer-implemented process of claim 4 wherein the intensity data is downsampled prior to using the RGB data to refine the rough calibration.

6. The computer-implemented process of claim 3, wherein the relationship between the corresponding depth map and intensity image data is used to refine the rough calibration.

7. The computer-implemented process of claim 1, wherein if a rough calibration cannot be computed,
    manually scanning the scene with one capture device by hand to capture the scene,
    building a model of the scene using images captured of the scene captured by the one capture device,
    computing a rough calibration by comparing the depth map images captured by each camera against the created model.

8. The computer-implemented process of claim 1 wherein separating the moving and non-moving data further comprises employing an optical flow diagram.

9. A computer-implemented process for calibrating an array of capture devices, comprising the process actions of:
    using hybrid capture devices, which capture both intensity data and depth data, to simultaneously capture depth maps and corresponding intensity images of a scene;
    finding common features in the depth maps from two hybrid capture devices;

automatically computing a rough calibration of extrinsic parameters of the hybrid capture devices; and using the intensity data to refine the rough calibration by,
- for an intensity image captured using a current hybrid capture device,
  - identifying features in the intensity image;
  - projecting each feature onto an intensity image of another hybrid capture device using the rough calibration data obtained from matching the depth maps; and
  - refining the rough calibration by matching the intensity features in the intensity image captured by the current hybrid capture device to intensity features in the intensity image captured by the other hybrid capture device using feature or window based matching.

10. The computer-implemented process of claim 9 further comprising checking the refined calibration by verifying matching intensity feature points and discarding non-matching feature points.

11. The computer-implemented process of claim 10 further comprising sending the non-discarded features to a bundle adjustment algorithm to calibrate the hybrid capture devices.

12. The computer-implemented process of claim 9 wherein the depth map data is obtained by using two IR cameras in a given hybrid capture device, and the intensity data is obtained by a RGB camera in the same given hybrid capture device.

13. The computer-implemented process of claim 9 wherein the rough calibration and the refined calibration are repeated using progressively less down sampled depth maps and RGB images.

* * * * *